US010002193B2

(12) United States Patent
Antic et al.

(10) Patent No.: US 10,002,193 B2
(45) **Date of Patent: *Jun. 19, 2018**

(54) IMPLEMENTATION OF DATA PROTECTION POLICIES IN ETL LANDSCAPES

(71) Applicant: INTERNATIONAL BUSINESS MACHINES CORPORATION, Armonk, NY (US)

(72) Inventors: Stevan Antic, Boca Raton, FL (US); Albert Maier, Tuebingen (DE); Oliver Suhre, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/682,968

(22) Filed: Aug. 22, 2017

(65) Prior Publication Data

US 2017/0351758 A1 Dec. 7, 2017

Related U.S. Application Data

(63) Continuation of application No. 14/729,174, filed on Jun. 3, 2015, now Pat. No. 9,760,633, which is a (Continued)

(51) Int. Cl.
*G06F 17/30* (2006.01)
*G06F 7/00* (2006.01)

(Continued)

(52) U.S. Cl.
CPC .. *G06F 17/30861* (2013.01); *G06F 17/30563* (2013.01); *G06F 21/6227* (2013.01);

(Continued)

(58) Field of Classification Search
None
See application file for complete search history.

(56) References Cited

U.S. PATENT DOCUMENTS 7,051,334 B1 * 5/2006 Porter ..................... H04L 12/66 709/201
7,296,288 B1 * 11/2007 Hill ..................... H04L 41/0896 713/194

(Continued)

OTHER PUBLICATIONS

Mrunalini et al., "Simulating Secure Data Extraction in Extraction Transformation Loading (ETL) Processes," 2009 Third UKSim European Symposium on Computer Modeling and Simulation, 2009, p. 142-147, IEEE Computer Society.

(Continued)

*Primary Examiner* — Kuen S Lu
(74) *Attorney, Agent, or Firm* — Robert C. Bunker

(57) ABSTRACT

Embodiments of the present invention provide systems, methods, and computer program products for processing data in an extract, transform, and load system. Embodiments of the present invention provide protective enhancements to be applied to data during extract-transform-load operations, including protections that can prevent unauthorized access and/or modifications to data stored on an intermediate computer system. Embodiments of the present invention can afford users with the ability to modify the protective enhancements and provide users with transformation operations compatible with the protective enhancements during extract-transform-load operations.

20 Claims, 10 Drawing Sheets

400

START
402 RECEIVE SOURCE DATA
404 RETRIEVE DATA PROTECTION POLICIES FOR THE SOURCE DATA
406 TRANSCODE THE SOURCE DATA
408 MODIFY AND PROTECT SOURCE DATA
410 TRANSMIT PROTECTED DATA
END

Related U.S. Application Data continuation of application No. 14/568,316, filed on Dec. 12, 2014, now Pat. No. 9,754,027.

(51) Int. Cl.
*G06F 21/62* (2013.01)
*H04L 29/06* (2006.01)

(52) U.S. Cl.
CPC ...... *G06F 21/6245* (2013.01); *H04L 63/0428* (2013.01); *H04L 63/20* (2013.01)

(56) References Cited

U.S. PATENT DOCUMENTS

| | | | | |
|---|---|---|---|---|
| 8,051,180 | B2 * | 11/2011 | Mazzaferri | G06F 3/1415 709/227 |
| 2005/0228728 | A1 * | 10/2005 | Stromquist | G06Q 40/12 705/30 |
| 2010/0205189 | A1 | 8/2010 | Ebrahimi et al. | |
| 2011/0295795 | A1 * | 12/2011 | Venkatasubramanian | G06F 17/30563 707/602 |
| 2012/0054147 | A1 * | 3/2012 | Goetz | G06F 17/30563 707/602 |
| 2012/0151597 | A1 | 6/2012 | Gupta et al. | |
| 2012/0272329 | A1 | 10/2012 | Grammer et al. | |
| 2013/0212711 | A1 | 8/2013 | Radkowski et al. | |
| 2014/0096261 | A1 | 4/2014 | Boldyrev et al. | |
| 2015/0348054 | A1 * | 12/2015 | Ogawa | G06Q 10/0635 705/317 |
| 2016/0171229 | A1 | 6/2016 | Antic et al. | |
| 2016/0171237 | A1 | 6/2016 | Antic et al. | |

OTHER PUBLICATIONS

Rastogi, "Simulating Secure Data Extraction in Extraction Transformation Loading (ETL) Processes," International Journal of Advance Research in Science and Engineering (IJARSE), Jun. 2014, p. 1-8, vol. No. 3, Issue No. 6.

Ritter et al., "Delphix Agile Data Masking User Guide," Documentation 4.0, Jun. 26, 2014, 1 Page, http://docs.delphix.com/display/DOCS40/Delphix+Agile+Data+Masking+User+Guide, Accessed on Sep. 25, 2014.

Voltage Security, "Data-centric Integration Meets Data-centric Protection," Partner Brief: Informatica, Feb. 22, 2013, 2 Pages, Voltage Security, Inc.

* cited by examiner

| ID | NAME | DOB | SSN | SERVICE CODE | DESCRIPTION | PATIENT CHARGE |
|---|---|---|---|---|---|---|
| 1 | Tom | 11/11/91 | 123-12-1234 | 984 | XYZ Description | $5,000 |
| 2 | Monica | 11/19/92 | 456-45-4567 | 882 | ABC Description | $3,000 |

FIG. 8

| COLUMN NAME | CHARACTER ENCODING | GLOSSARY DEFINED ATTRIBUTES | PROTECTION CLASSES | SUPPORTED ETL ENGINE TRANSFORMATIONS | PCM COMPLIANCE |
|---|---|---|---|---|---|
| ID | STRING, KEY | Customer ID | N/A | N/A | N/A |
| NAME | STRING | Partner Name | Shuffle | All String Functions (Trim, Sort, Consolidation) | YES |
| DOB | DATE | Date of Birth | Shuffle | All data related Parse Functions | YES |
| SSN | NUMERIC | Identification Number | Split | N/A | YES |
| SERVICECODE | NUMERIC | Diagnosis and Procedure Code | Encrypt-1 | Frequency Counter, Sort | YES |
| DESCRIPTION | STRING | Medical Procedure Description | Pass | TXT Analytics | YES |
| PATIENTCHARGE | FLOATING POINT | Service Charge | Encrypt-2 | COMPARE, SORT | NO |

FIG. 9

IMPLEMENTATION OF DATA PROTECTION POLICIES IN ETL LANDSCAPES

BACKGROUND OF THE INVENTION

The present invention relates generally to the field of data protection, and more particularly to extract-transform-load technology.

An extract-transform-load (ETL) technology transports large amounts of data from one or more source computer systems to one or more target computer systems in operational and analytical systems (e.g., SAP business applications, etc.). Data transference of sensitive information (e.g., salary details, credit card details, confidential personal details, etc.) may involve transforming, cleansing, and consolidating the data in order to protect the sensitive information, regardless of what protection the target computer system may offer. The protection of sensitive information may be compromised during the transference of data by changing existing data integration jobs to make the sensitive information visible.

SUMMARY

Embodiments of the present invention provide systems, methods, and program products for processing data in an extract, transform, and load system. In one embodiment, a method is provided, the method comprising: receiving, by a first computer system, data from a source application to be transformed by an intermediate computer system and transmitted to a target computer system; applying, by the first computer system, one or more data protection policies to the received data to control user access to the received data when stored on the intermediate computer system; applying, by the first computer system, one or more data protection policies to the received data to obscure content of the received data; transmitting, by the first computer system, the protected and obscured data to the intermediate computer system; and transforming, by the intermediate computer system, the protected and obscured data into a format used by the target computer system.

BRIEF DESCRIPTION OF THE DRAWINGS

FIG. 8 provides an example of source data from a source application, in accordance with an embodiment of the present invention;

FIG. 9 is an example of metadata used by the computing environment, in accordance with an embodiment of the present invention.

DETAILED DESCRIPTION

Embodiments of the present invention provide systems, methods, and computer program products for implementing data protection policies in extract-transform-load (ETL) systems. Embodiments of the present invention can be deployed in the context of transferring data in retail, healthcare, financial and industrial applications. For illustrative purposes, numerous examples and specific details are set forth to provide a thorough understanding of the present disclosure. It will be evident, however, to one skilled in the art that the present disclosure, as defined by the claims, may include some or all of the features in these examples alone or in combination with other features described below, and may further include modifications and equivalents of the features and concepts described herein.

Figure 1:
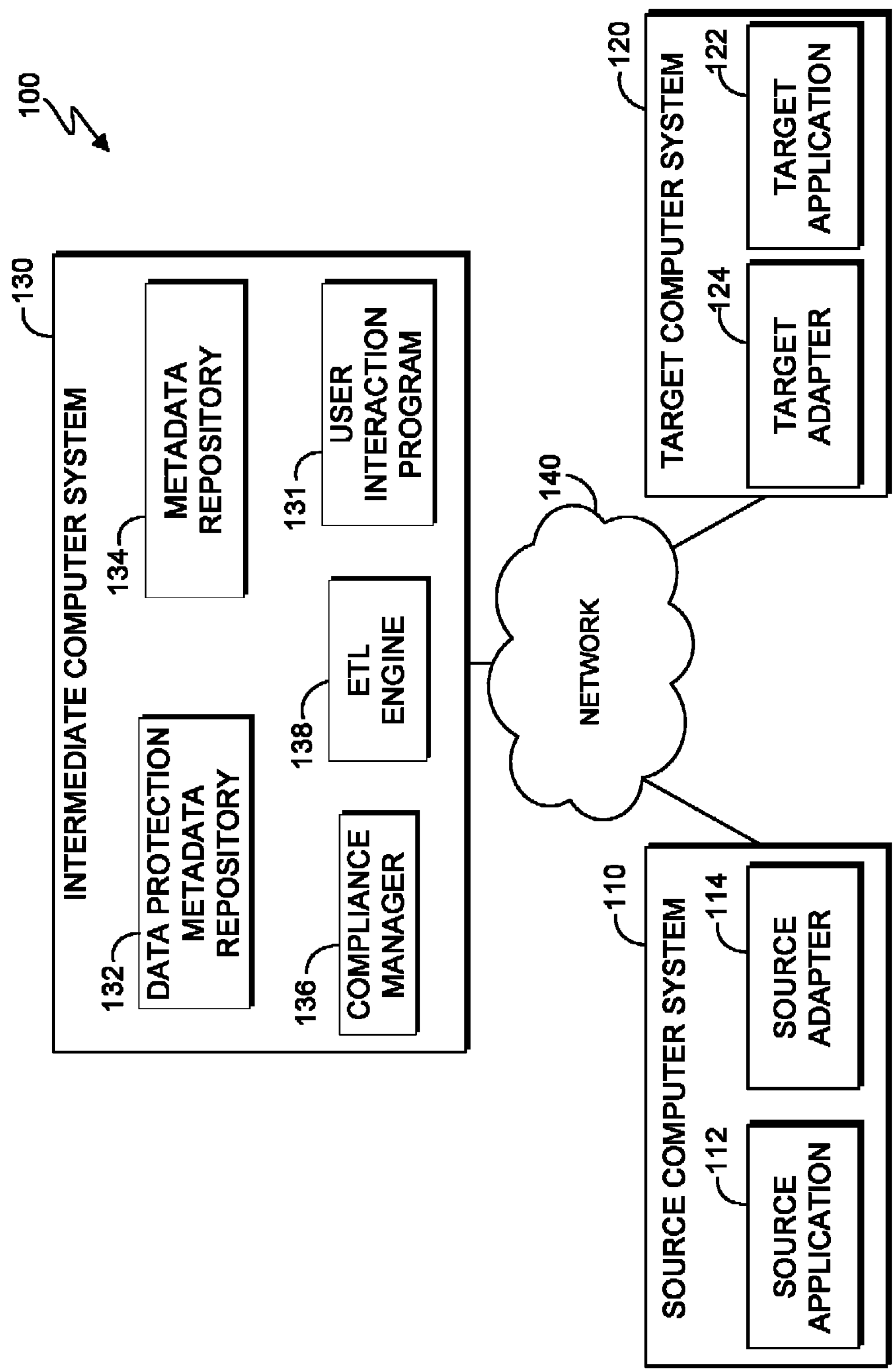
FIG. 1 is a block diagram illustrating a computing environment, in accordance with an embodiment of the present invention.

FIG. 1 is a block diagram illustrating computing environment 100, in accordance with an embodiment of the present invention. Computing environment 100 includes source computer system 110, target computer system 120, and intermediate computer system 130, all interconnected by network 140. Source computer system 110, target computer system 120, and intermediate computer system 130 can be desktop computers, laptop computers, specialized computer servers, or any other computer systems known in the art. In certain embodiments, source computer system 110, target computer system 120, and intermediate computer system 130 represent computer systems utilizing clustered computers and components to act as a single pool of seamless resources when accessed through network 140. In certain embodiments, source computer system 110, target computer system 120, and intermediate computer system 130 represent virtual machines. In general, source computer system 110, target computer system 120, and intermediate computer system 130 are representative of any electronic device, or combination of electronic devices, capable of executing machine-readable program instructions, as discussed in greater detail with regard to FIG. 10. For illustrative purposes, it should be understood that, components of computing environment 100 can be disposed in one or more computer systems such that computing environment 100, and components therein, can operate in accordance with an embodiment of the present invention. For example, source computer system 110, target computer system 120, and intermediate computer system 130 can be on one computer system, or components therein can be disposed across multiple computer systems.

Source computer system 110 includes source application 112 and source adapter 114. In this embodiment, source application 112 provides source data to be transferred to target computer system 120, and source adapter 114 protects the source data before transferring the source data to target computer system 120. In this embodiment, protected source data is transferred to ETL engine 138 prior to being transferred to target computer system 120. Although not illustrated, in some instances, protected source data can bypass ETL engine 138 and be transmitted directly to target computer system 120. The phrase "source data", as used herein, refers to data that is received, processed, or otherwise generated by source application 112 (e.g., credit card information, address information, salary information, etc.). For example, source application 112 may receive source data (e.g., credit card information) from a user of source application 112. The source data can correlate to source metadata comprising encryption algorithm information and other metadata tags. Source adapter 114 modifies and protects source data to create protected source data, as discussed in greater detail with regard to FIG. 4. Accordingly, source adapter 114 can transmit the protected source data for subsequent transformation by ETL engine 138 prior to loading the transformed data onto target computer system 120, as discussed in greater detail with regard to FIG. 5.

Source adapter 114 transcodes a character encoding of the source data into a character encoding of data used by ETL engine 138 (e.g., from UTF-16 (Unicode Transformation Format) to UTF-8). Furthermore, source adapter 114 applies data protection policies to the source data by modifying and protecting one or more values of attributes in the source data. The phrase, "attribute classifications", as used herein, refers to categorizations or classifications of attributes in source data. For example, the source data may comprise salary information, social security numbers, and personal identification information. In this instance, the source data comprises three attributes, wherein a first attribute contains salary information, a second attribute contains social security numbers, and a third attribute contains personal identification information. In this embodiment, an attribute classification can also provide information pertinent to protecting one or more values of an attribute (i.e., an indication to protect one or more values of an attribute) and other design information, as described in greater detail with regard to FIG. 9. One or more protection classes (e.g., encryption, shuffle, etc.) can be applied to one or more values of attributes, in accordance with data protection policies and/or attribute classifications, as discussed in greater detail with regard to FIG. 2. The phrase, "data protection policies", as used herein, refers to policies that instruct whether and how to modify and protect data prior to, during, and after, transformation. For example, a set of data protection policies for the source data may specify to modify the first attribute (e.g., salary information), only modify specific values of the third attribute (e.g., personal identification information) based on criteria, and protect all attributes of the source data such that only an administrative user of intermediate computer system 130 having specified access rights can view and/or edit protected source data for specified operations (e.g., manually editing the source data, etc.). The criteria to only modify specific values of the third attribute can be based on a specification (e.g., a user specification, attribute classification, etc.). For example, the criteria provided by a user may specify to modify specific values of the third attribute which reference a particular date range.

Intermediate computer system 130 includes user interaction program 131, data protection metadata repository 132, metadata repository 134, compliance manger 136, and ETL engine 138.

User interaction program 131 provides an interface with which an administrative user can view and/or edit data on intermediate computer system 130, in accordance with data protection policies for the data. In this embodiment, user interaction program 131 reverts and applies data protection policies to the protected source data received by intermediate computer system 130.

Data protection metadata repository 132 contains data protection policies for data and metadata (e.g., source metadata, etc.). Furthermore, data protection metadata repository 132 also contains metadata for users of source application 112 (i.e., user metadata) and administrative users of user interaction program 131 (i.e., administrative user metadata). Accordingly, intermediate computer system 130 can use the administrative user metadata to determine whether an administrative user can view and/or edit data on intermediate computer system 130 based on data protection policies for the data, as described in FIG. 5. In another embodiment, data protection metadata repository 132 receives, from a glossary, attributes predefined by an administrative user that can be used to help map source data to target computer system 120. Furthermore, the glossary can provide predefined data protection policies (e.g., protection classes used to modify data) and predefined attributes. In another embodiment, data protection metadata repository 132 receives user metadata from a registry. Furthermore, data protection metadata repository 132 contains transformation specifications (e.g., transformation-protection class compatibility specifications, transformation equivalency specifications, etc.) that instruct which transformations are to be applied to data in intermediate computer system 130 by ETL engine 138.

Metadata repository 134 contains character encodings of data used by source computer system 110, intermediate computer system 130, and target computer system 120, also instructions that specify how to transcode the character encodings of data used by each computer system in computing environment 100, and metadata that describe operations performed by computing environment 100 during runtime. In this embodiment, metadata that describes operations performed by intermediate computer system 130 can provide compliance manger 136 with information to determine whether the operations performed on data by intermediate computer system 130 are compliant with data protection policies for the data. Although not illustrated, in other embodiments, data protection metadata repository 132 is a component disposed within metadata repository 134.

Compliance manger 136 provides a list of transformations to be applied to data in intermediate computer system 130 that are compliant with data protection policies and are compatible with protection classes applied to the data. In this embodiment, compliance manger 136 investigates operations performed on data by intermediate computer system 130. Furthermore, compliance manager 136 identifies transformations applied to the data that do not comply with the data protection policies for the data and provides complaint and compatible transformations. In another embodiment, compliance manager 136 can provide alternative protection classes to be applied to data during subsequent operations of computing environment 100. Accordingly, providing alterative protection classes can increase a number of compatible transformations that are to be applied to the data.

ETL engine 138 extracts source data from source computer system 110, transforms the extracted source data into an appropriate format used by target computer system 120, and loads the transformed source data into target computer system 120. Transformations performed by ETL engine 138 can include, for example, one or more of lookup, mapping, sorting, encoding, deduplication, consolidation, and/or other operations. In certain embodiments, ETL engine 138 may perform a large number of transformations to one or more values of attributes. In this instance, ETL engine 138 determines if and how data in intermediate computer system 130 can be protected based on metadata presented in FIG. 9 and information that describes operations of ETL engine 138.

Target computer system 120 includes target application 122 and target adapter 124. In this embodiment, target application 122 receives transformed source data. Furthermore, target adapter 124 transcodes the character encoding of the transformed source data before transmitting the transformed source data to target application 122.

Figure 2:
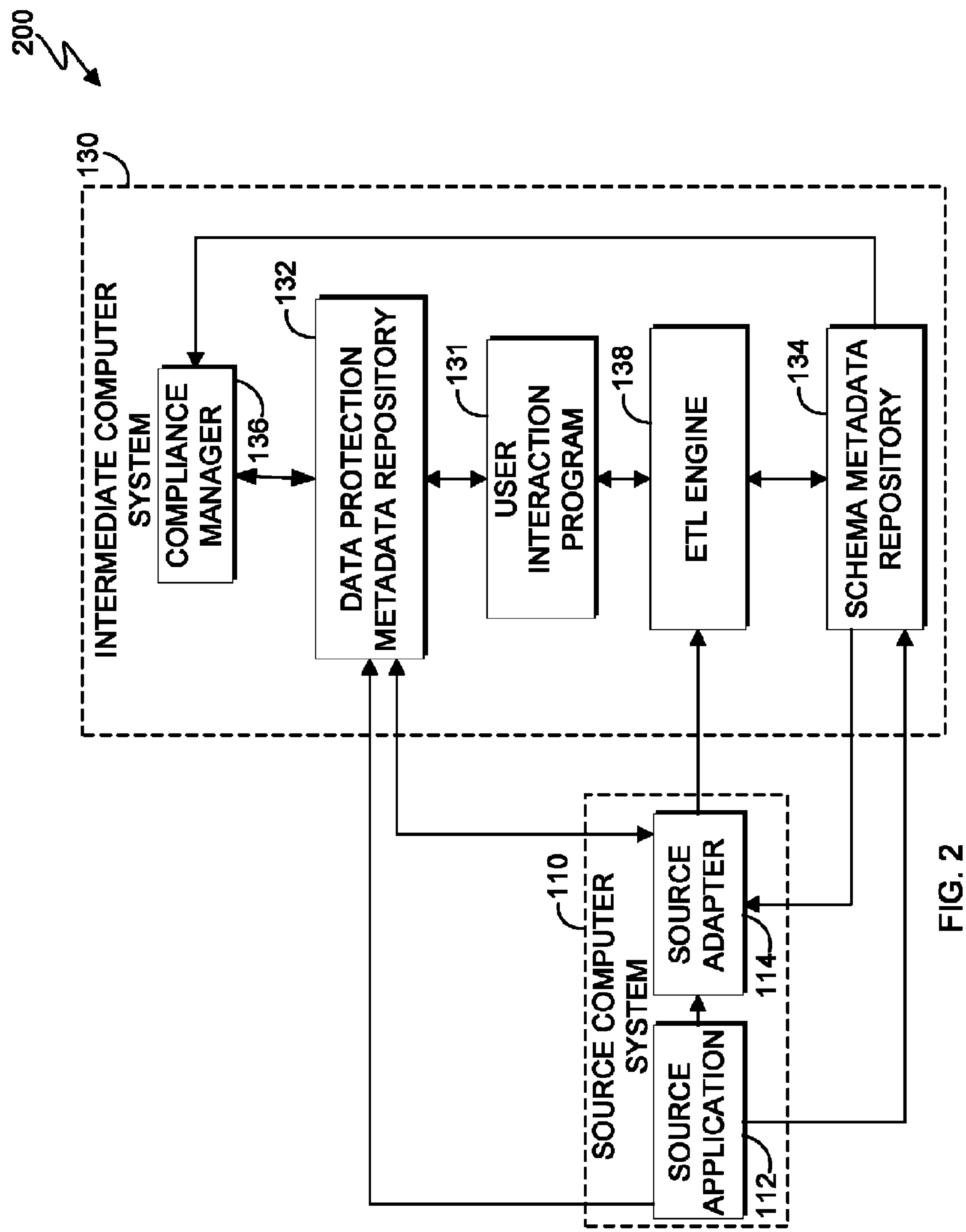
FIG. 2 is a block diagram illustrating interactions of components of a source computer system and an intermediate computer system, in accordance with an embodiment of the present invention.

FIG. 2 is a block diagram 200 illustrating interactions of components of source computer system 110 and intermediate computer system 130, in accordance with an embodiment of the present invention. In this embodiment, source computer system 110, and components therein, transcodes, modifies, and protects source data based on information received by intermediate computer system 130.

Source application 112 transmits source data to source adapter 114 for subsequent modification and protection of the source data. In this embodiment, source application 112 transmits schema used by source application 112 to metadata repository 134. Accordingly, ETL engine 138 can use schema used by source application 112 to transform protected source data.

Source adapter 114 retrieves data protection policies from data protection metadata repository 132 that instruct which protection classes are to be applied to one or more values of each attribute in the source data. The phrase, "protection classes", as used herein, refers to one or more operations performed on one or more values of an attribute to obscure those values (i.e., protective enhancements), as described in greater detail later in this specification. Protection classes can be applied to values of attributes on an individual basis and/or to all values of attributes based on criteria (e.g., user specification, attribute classification, etc.), as described in greater detail with regard to FIG. 1. The protection classes can include, for example, encrypt-n, rules-n, shuffle, hide, poison, split, and pass protection classes, and combinations thereof. An encrypt-n protection class encrypts one or more values of an attribute (i.e., source data content) before transmitting the source data to ETL engine 138. In another embodiment, an encryption algorithm that corresponds to source metadata may be used to determine which transformations (e.g., lookup, mapping, sorting, encoding, etc.) are supported by the type of the encrypt-n protection class (e.g., encrypt-1, encrypt-2, etc.). A shuffle protection class redistributes one or more values of an attribute before transmitting the source data to ETL engine 138. A rules-n protection class modifies one or more values of an attribute using pre-defined rules before transmitting the source data to ETL engine 138. Furthermore, the rules-n protection class can provide a way to identify capital letters, wild card characters, and map numbers using a utility (e.g., homomorphic, bidirectional transformation). For example, an attribute, "Ticker IBM, Transaction: Stop Order, Value 230$. Execution date expiration Apr. 1, 2012." may transform into: "Ticker *@^, (ransaction: 0top 9rder, Aalue FB9$. Pxectuion date experiation Upril 8 F98F." A hide protection class hides one or more values of an attribute before transmitting the source data to ETL engine 138. Furthermore, the hide protection class can provide a way to modify a value of an attribute, such as "Ticker IBM, Transaction: Stop Order, Value 230$. Execution date expiration Apr. 1, 2012." into "XXXXXXXXXXXXXXXXXXXXXXXXXXXXXX." A poison protection class injects specified data into one or more values of an attribute before transmitting the source data to ETL engine 138. Furthermore, the poison protection class can provide a way to inject numbers according to a rule (e.g., the rule may be inject numbers up to a max value of the number). For example, an attribute value, "Stop Order, Value: 230$" may transform to "Stop Order, Value: 923340$." A split protection class splits one or more values of an attribute and redirects the specific attributes to target adapter 124 (not shown in FIG. 2) where the remaining one or more values of the attribute are joined in target adapter 124, and then transmits to target application 122. Furthermore, the split protection class can provide a way where ETL engine 138 splits one or more values of an attribute because the split values are not needed in ETL engine 138 (i.e., it is not necessary to access the values of the attribute in ETL engine 138). Lastly, a pass protection class passes one or more values of an attribute unmodified to ETL engine 138. Furthermore, the pass protection class may indicate that no modification is necessary for the one or more values of the attribute. Accordingly, source adapter 114 applies protection classes to modify one or more values of each attribute in the source data, in accordance with data protection policies and, in some instances, attribute classifications.

Source adapter 114 retrieves data protection policies from data protection metadata repository 132 to instruct whether and how to protect source data prior to, during, and after, transformation. Furthermore, data protection policies also specify access rights to enable or prevent administrative users to access/view/edit data in intermediate computer system 130. For example, set data protection policies may enable an administrative user to access source data for specified operations (e.g., metadata import, ETL job design, edit attributes manually, accessing unprotected data, etc.). Accordingly, source adapter 114 applies access rights to one or more values of each attribute in the source data. Source adapter 114 performs any necessary transcoding to the character encoding of data used by source computer system 110 (e.g., UTF-16) into a character encoding of data used by ETL engine 138 (e.g., UTF-8). Character encoding information can be stored in metadata repository 134 for access by source adapter 114. Accordingly, source adapter 114 transcodes the character encoding of the source data into the character encoding of data used by ETL engine 138. Source adapter 114 transmits protected and obscured source data (i.e., source data that source adapter 114 modified and protected) to ETL engine 138.

Compliance manger 136 retrieves metadata that describes operations performed by ETL engine 138 from metadata repository 134. Compliance manger 136 may determine that one or more transformations applied to the protected source data are not compliant with data protection policies received from data protection metadata repository 132. For example, the data protection policy may specify that an encrypt-2 protection class is to be applied to the protected source data. In this instance, a transformation (e.g., sort) may not be supported by the encrypt-2 protection class. Accordingly, compliance manager 136 transmits alternative transformations that specify transformations that are compliant with data protection policies. In this embodiment, compliance manager 136 provides alternative transformations to an administrative user and notifies the user of the non-complaint transformation. In another embodiment, compliance manger 136 transmits alternative protection classes to be applied to data during subsequent operations of computing environment 100, as previously described in greater detail with regard to FIG. 1.

User interaction program 131 retrieves data protection policies and administrative user metadata from data protection metadata repository 132. In this embodiment, an administrative user generates administrative user metadata stored in data protection metadata repository 132. Furthermore, user interaction program 131 uses the administrative user metadata and data protection policies received from data protection metadata repository 132 to determine whether the administrative user can access/view/edit data in intermediate computer system 130. Accordingly, if the data protection policies specify that the administrative user can access/view/edit data in intermediate computer system 130, then user interaction program 131 receives protected source data from ETL engine 138 such that the administrative user can access/view/edit the protected source data and transmits either unedited protected source data or edited protected source data to ETL engine 138 for subsequent transformations.

ETL engine 138 transmits character encoding of data used by ETL engine 138, as well as metadata that describes operations performed by ETL engine 138 to metadata repository 134. As previously described, information transmitted to metadata repository 134 by ETL engine 138 can be used to transcode the character encoding of source data into a character encoding of data used by ETL engine 138, as well as identify transformations that do not comply with data protection policies. In this embodiment, ETL engine 138 retrieves schema used by source application 112 and target application 122 to transform protected source to a format used by target application 122. In certain embodiments, during the transformation of protected source data, ETL engine 138 generates one or more intermediate schema used by ETL engine 138 and can also be transmitted to metadata repository 134 to help describe ETL engine 138 job design.

Figure 3:
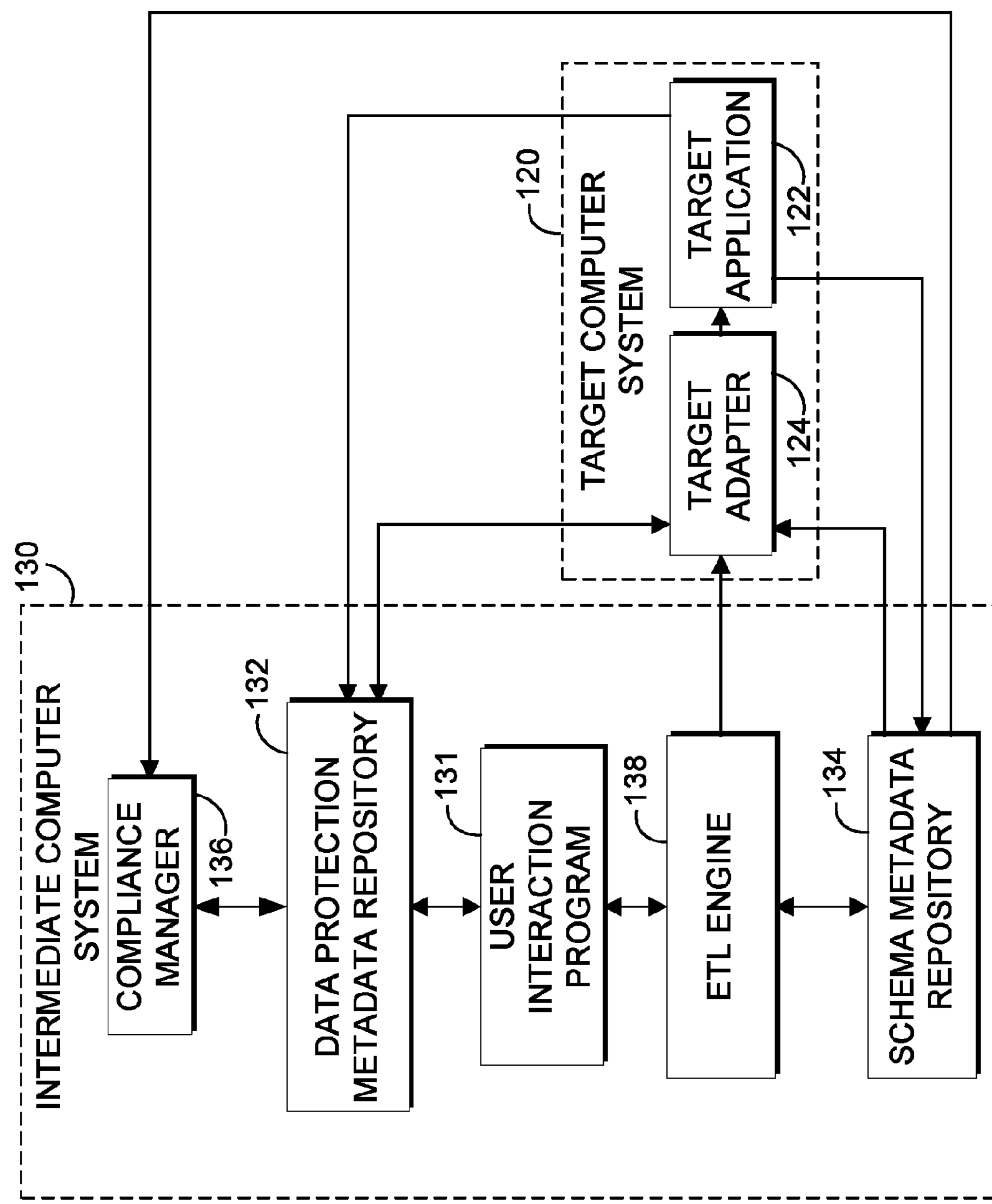
FIG. 3 is a block diagram illustrating interactions of components of a target computer system and the intermediate computer system, in accordance with an embodiment of the present invention.

FIG. 3 is a block diagram 300 illustrating interactions of components of target computer system 120 and intermediate computer system 130, in accordance with an embodiment of the present invention. In this embodiment, ETL engine 138 transforms the protected source data transmitted by source computer system 110 using specified transformation, schema used by source application 112, and schema used by target application 122, to create transformed data.

Target adapter 124 retrieves data protection policies from data protection metadata repository 132. Accordingly, target adapter 124 can revert data protection policies from the transformed data so that protective enhancements applied to the transformed data (i.e., via applied protection classes) are removed. Target adapter 124 receives the transformed data from ETL engine 138. Furthermore, target adapter 124 transcodes the character encoding of the transformed data into a character encoding of data used by target application 122 (e.g., from UTF-8 to UTF-16).

Target application 122 transmits schema used by target application 122 to metadata repository 134. Accordingly, ETL engine 138 can use the schema used by target application 122 to transform protected source data.

Figure 4:
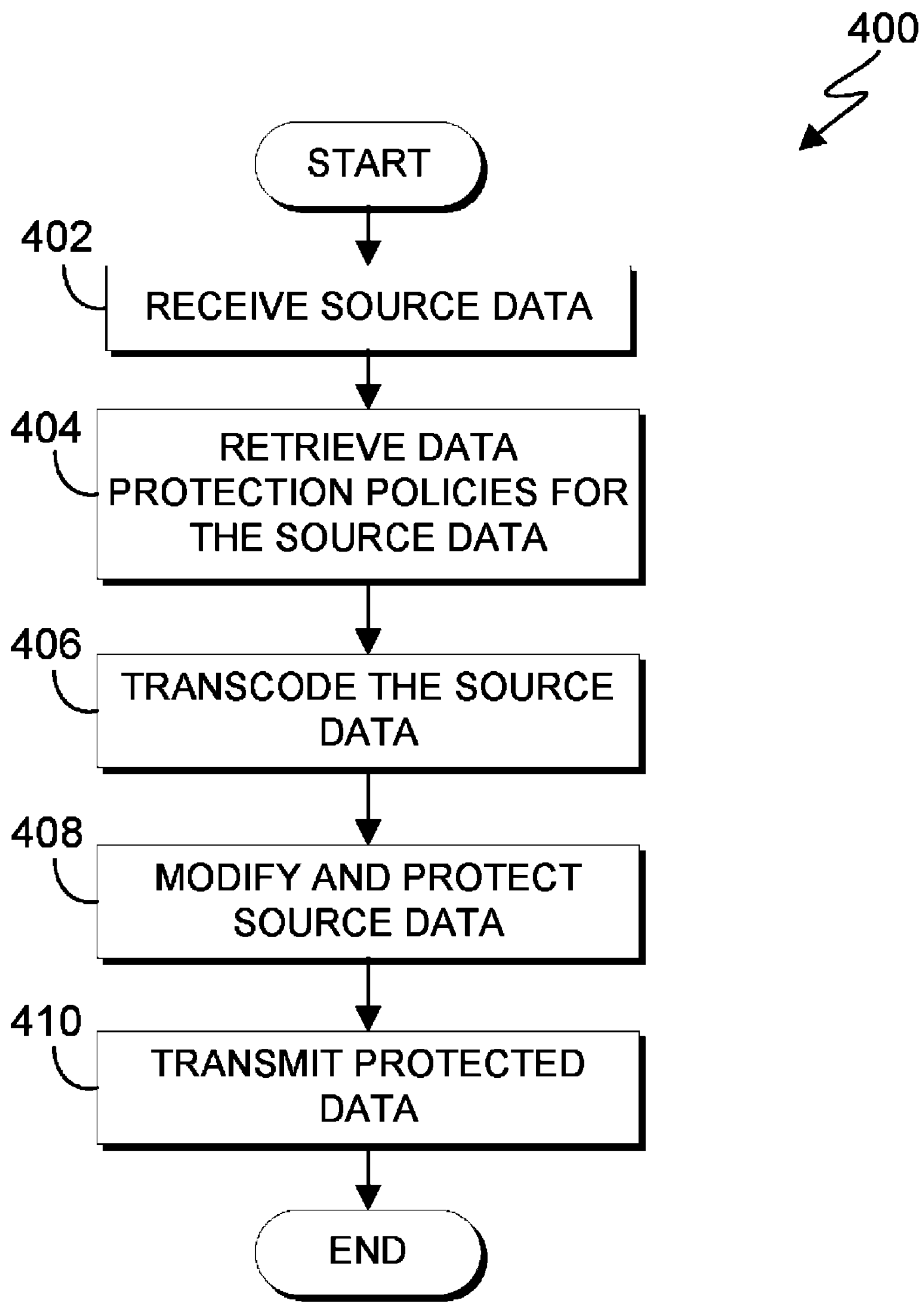
FIG. 4 is a flowchart illustrating operational steps for protecting source data and transmitting protected source data to the intermediate computer system, in accordance with an embodiment of the present invention.

FIG. 4 is a flowchart 400 illustrating operational steps for protecting source data and transmitting protected and obscured source data to intermediate computer system 130, in accordance with an embodiment of the present invention.

In step 402, source adapter 114 receives source data from source application 112.

In step 404, source adapter 114 retrieves data protection policies for the source data. In this embodiment, source adapter 114 receives data protection policies for source data from data protection metadata repository 132. As previously discussed, the data protection policies instruct which protection classes are to be applied to one or more values of an attribute as specified by an attribute classification and/or data protection policy of the source data. Additionally, data protection policies specify access rights to be applied to one or more values of each attribute in the source data.

In step 406, source adapter 114 transcodes the character encoding of source data into a character encoding of data used by ETL engine 138. In this embodiment, source adapter 114 uses information from metadata repository 134 that instruct how to transcode the source data. As previously discussed, the information from metadata repository 134 used by ETL engine 138 can be used to transcode the extracted source data, such that principal content of the source data is not changed, other than the extracted source data's encoding. For example, the source data may be represented in source application 112 as 123,456, and may be represented in ETL engine 138 as 1.23456e+05.

In step 408, source adapter 114 applies data protection policies to the source data to protect and obscure the source data. In this embodiment, source adapter 114 modifies the source data by applying one or more protection classes to one or more values of each attribute in the source data. Furthermore, source adapter 114 protects the source data by applying access rights to one or more values of each attribute in the source data.

In step 410, source adapter 114 transmits protected source data. Accordingly, in this embodiment, source adapter 114 creates protected source data and transmits the protected source data to ETL engine 138. In another embodiment, source adapter 114 applies a "split" protection class, which specifies that the protected data bypasses ETL engine 138 and is transmitted directly to target computer system 120.

Figure 5:
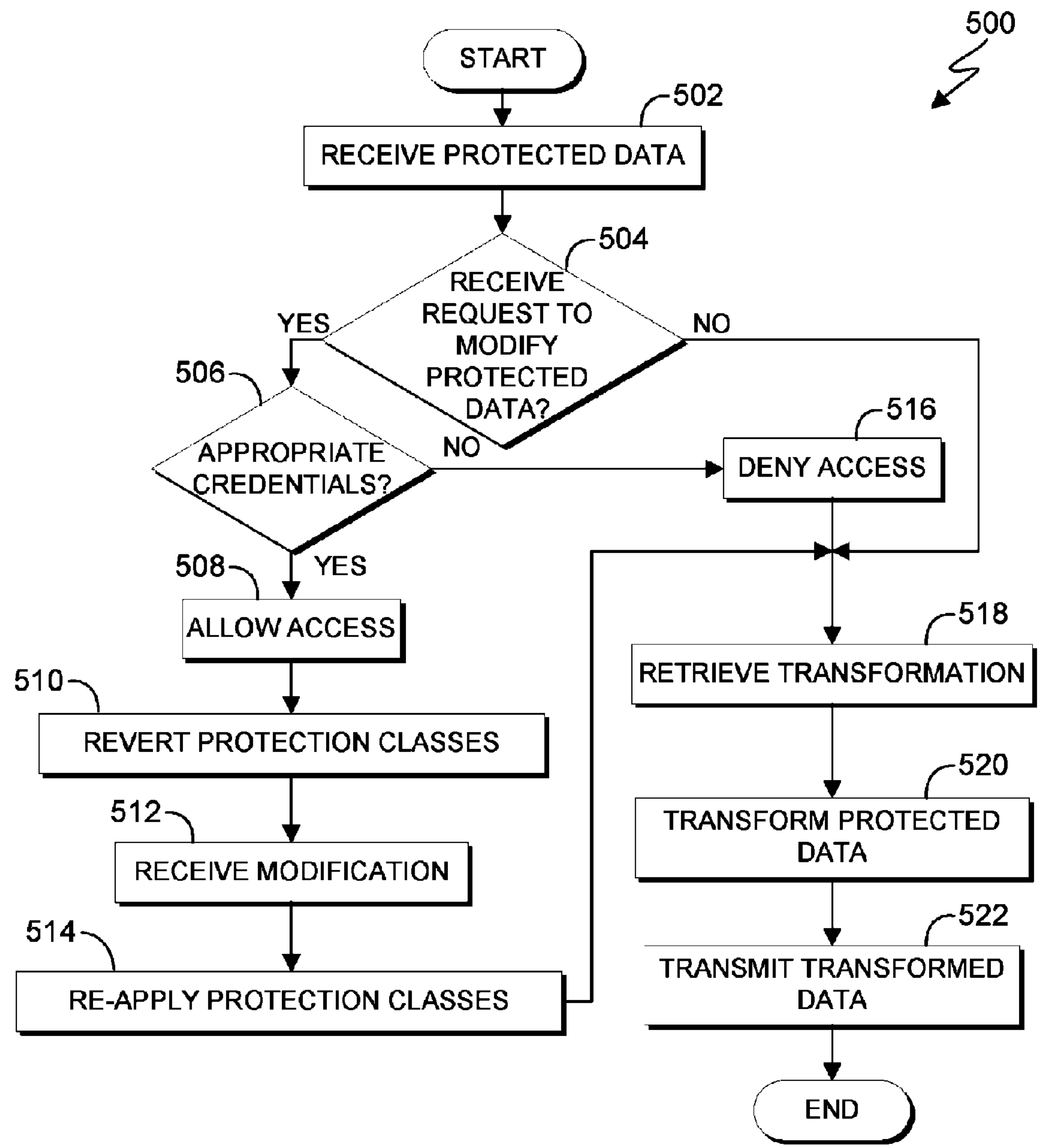
FIG. 5 is a flowchart illustrating operational steps for transforming protected source data and transmitting transformed protected source data to the target computer system, in accordance with an embodiment of the present invention.

FIG. 5 is a flowchart 500 illustrating operational steps for transforming the protected source data and transmitting transformed protected source data to target computer system 120, in accordance with an embodiment of the present invention. In this embodiment, intermediate computer system 130, and components therein (e.g., user interaction program 131, data protection metadata repository 132, etc.), can be used to modify the protected source data based on administrative user input. Furthermore, ETL engine 138 transforms the protected source data into transformed source data. For illustrative purposes, it should be understood that source data also corresponds to source metadata that can undergo the same processing, transforming, modifying, and transmitting operations performed on the source data (as described with regard to source data in FIGS. 4-6).

In step 502, ETL engine 138 receives the protected source data from source adapter 114.

In step 504, user interaction program 131 determines whether a request to modify the protected source data is received. In this embodiment, user interaction program 131 can receive a request from a user seeking to access, view, and/or edit the protected source data.

If, in step 504, user interaction program 131 determines that a request to modify the protected source data is not received, then, in step 518, ETL engine 138 retrieves one or more transformations to be applied to the protected source data. In this embodiment, ETL engine 138 retrieves transformation specifications from data protection metadata repository 132.

If, in step 504, user interaction program 131 determines that a request to modify the protected is received, then, in step 506, user interaction program 131 determines whether the administrative user has appropriate credentials. In this embodiment, user interface 131 uses data protection policies and the administrative user metadata from data protection metadata repository 132 to determine whether the administrative user has appropriate credentials.

If, in step 506, user interaction program 131 determines that the administrative user does not have appropriate credentials, then, in step 516, user interaction program 131 denies the administrative user access/view/edit to the protected source data.

If, in step 506, user interaction program 131 determines that the administrative user does have appropriate credentials, then, in step 508, user interaction program 131 allows the administrative user to view/access the protected source data.

In step 510, user interaction program 131 reverts the protection classes that were applied to the protected source data. Accordingly, the administrative user can have access to the original (i.e., unobscured) source data that was provided by source application 112.

In step 512, user interaction program 131 receives modifications from the administrative user to edit the reverted protected source data. In another embodiment, the administrative user may be authorized to modify administrative user access rights. Furthermore, in step 512, user interaction program 131 applies the modifications specified by the administrative user to the protected source data.

In step 514, user interaction program 131 re-applies protection classes to the reverted protected source data. In another embodiment, user interaction program 131 may apply updated protection classes (i.e., modified protection classes specified by a user). Accordingly, user interaction program 131 modifies and protects the reverted protected source data in accordance with the data protection policies to create modified, protected source data. Subsequently, user interaction program 131 can transmit the modified, protected source data to ETL engine 138 for transformation.

In step 518, ETL engine 138 retrieves specified transformation (e.g., instructions to select, translate, encode, sort, join, aggregate, transpose, look-up, map, etc.) from data protection metadata repository 132. In another embodiment, ETL engine 138 retrieves alternative compliant transformations that were provided by compliance manager 136, as described in greater detail with regard to FIG. 7.

In step 520, ETL engine 138 transforms the protected source data (i.e., either the modified protected source data, or the protected source data transmitted by source adapter 114) to create transformed data using the retrieved transformation specifications. Furthermore, ETL engine 138 ensures that the protected source data is in a format that comports with schema used by target application 122.

In step 522, ETL engine 138 transmits the transformed and protected data to target adapter 124 for subsequent processing. In this embodiment, ETL engine 138 transmits transformed data that has the same format (e.g., comports with schema) used by target computer system 120.

Figure 6:
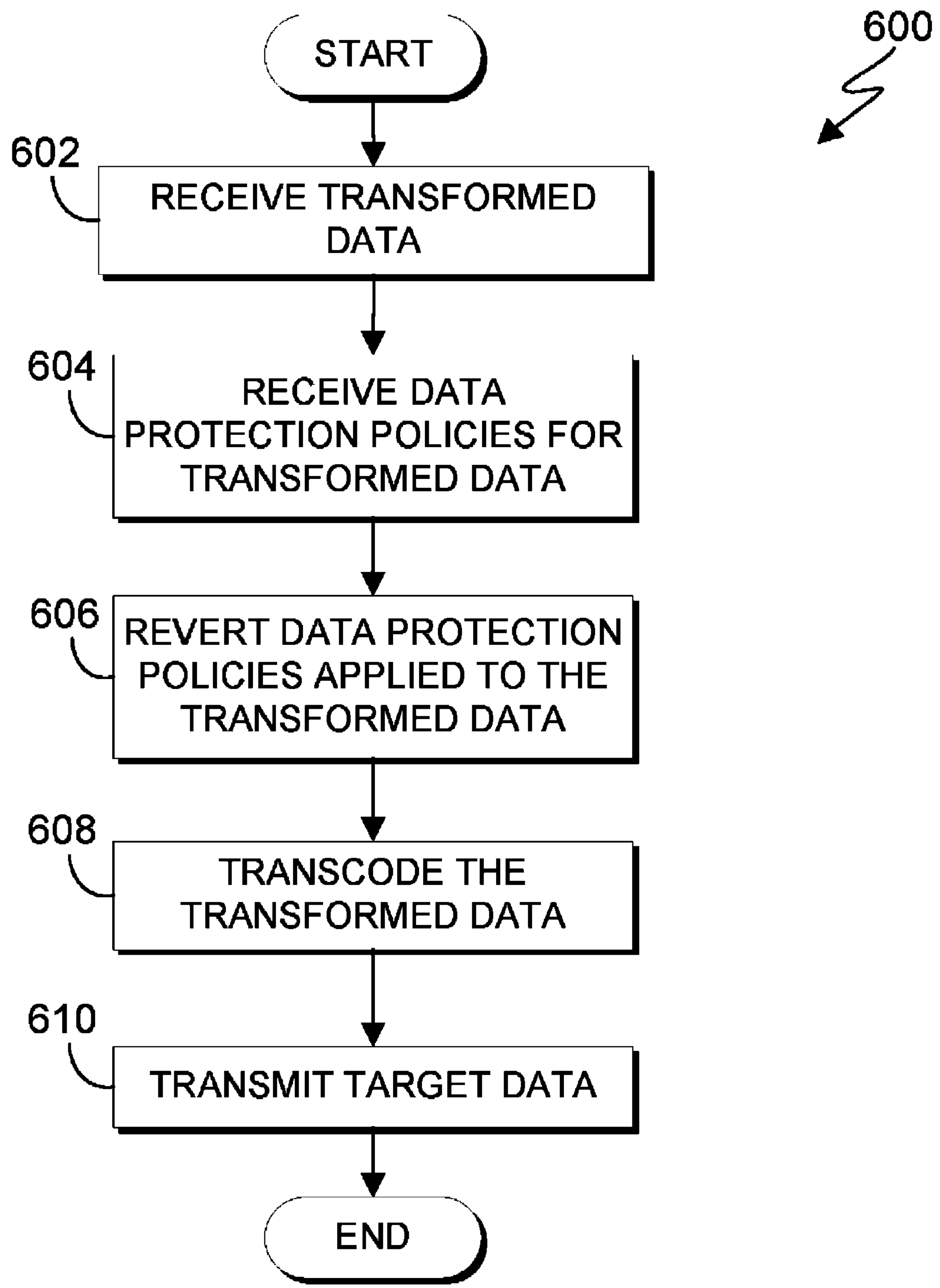
FIG. 6 is a flowchart illustrating operational steps for loading transformed data into the target computer system, in accordance with an embodiment of the present invention.

FIG. 6 is a flowchart 600 illustrating operational steps for loading the transformed data received from intermediate computer system 130 into target computer system 120, in accordance with an embodiment of the present invention.

In step 602, target adapter 124 receives the transformed data from ETL engine 138.

In step 604, target adapter 124 retrieves data protection policies for the transformed data from data protection metadata repository 132.

In step 606, target adapter 124 reverts the data protection policies for the transformed data to remove specified protective enhancements (e.g., protection classes and access rights) applied to the transformed data.

In step 608, target adapter 124 transcodes the character encoding of transformed data into a character encoding of data used by target application 122. In this embodiment, target adapter 124 uses information from metadata repository 134 to transcode the transformed data. As previously discussed, the information from metadata repository 134 can be used to transcode the transformed data, such that principal content of the transformed data is not changed, other than the extracted source data's encoding.

In step 610, target adapter 124 transmits target data. In this embodiment, target adapter 124 transcodes the transformed data, modifies the transformed data by reverting the applied protection classes and access rights, to create target data to be transmitted to target application 122.

Figure 7:
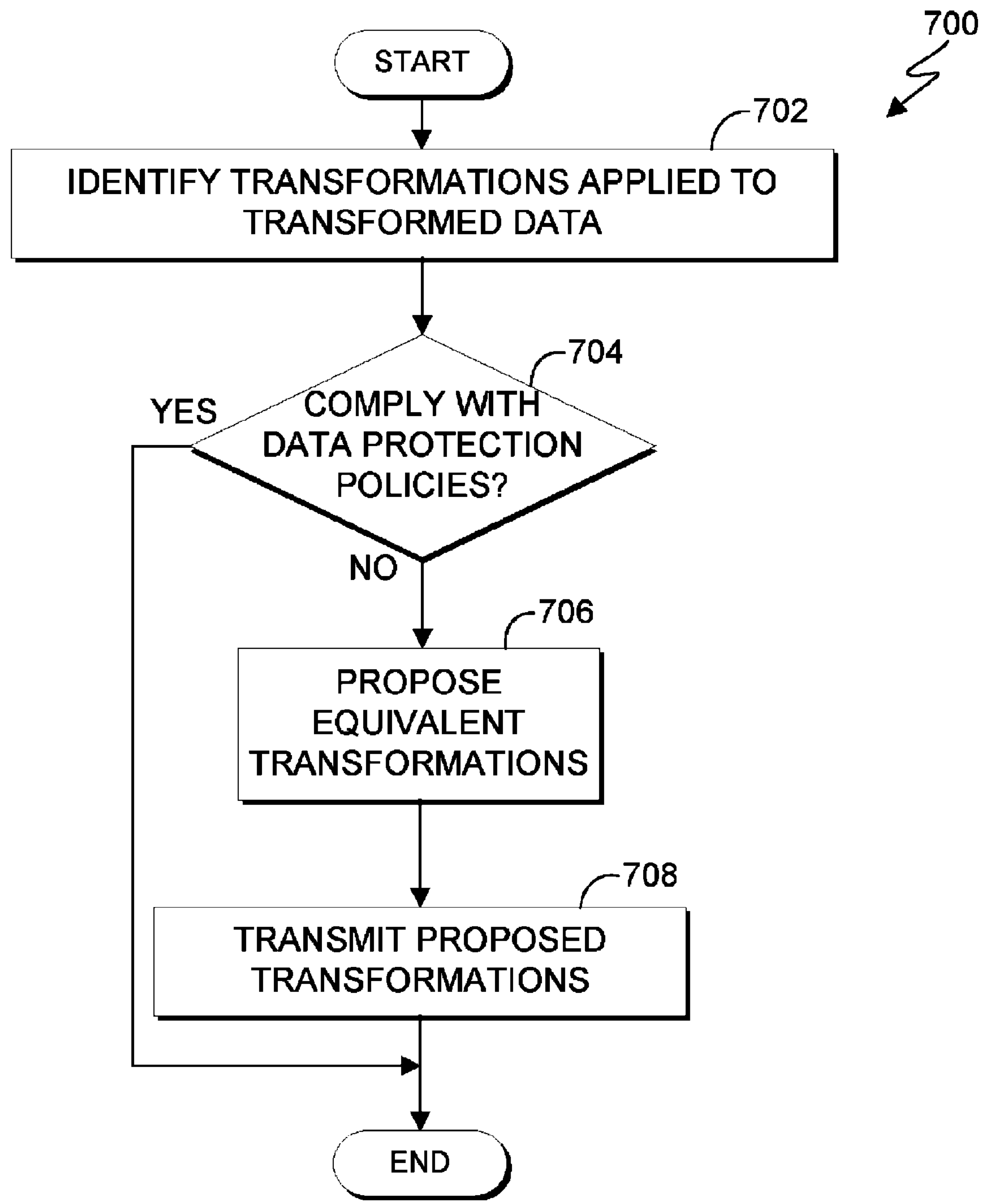
FIG. 7 is a flowchart illustrating operational steps for providing data protection compliant operations of the computing system environment, in accordance with an embodiment of the present invention.

FIG. 7 is a flowchart 700 illustrating operational steps for providing operations for computing system environment 100 that are compliant with data protection policies, in accordance with an embodiment of the present invention. Operational steps described in FIG. 7 can be used to propose compliant and compatible operations prior to applying transformations to protected source data, prior to applying protection classes to source data, or after transmitting transformed data to target computer system 120. In this embodiment, operational steps described in FIG. 7 are performed after intermediate computer system 130 transmits metadata that describes operations performed by intermediate computer system 130 during runtime to metadata repository 134 (i.e., after transformed data is created by intermediate computer system 130). In another embodiment, compliance manger 136 can propose alternative protection classes to be applied by source adapter 114. As previously discussed, providing alterative protection classes can increase the number of compatible transformations that are to be applied to the data.

In step 702, compliance manger 136 identifies transformations that were applied to transformed data. In this embodiment, compliance manger 136 uses metadata that describes operations performed by ETL engine 138 from metadata repository 134 to determine the transformations applied to the transformed data.

In step 704, compliance manager 136 determines whether the identified transformations applied to the transformed data comply with data protection policies for the transformed data. In this embodiment, compliance manger 136 determines whether the identified transformations are compliant with data protection policies by determining if the identified transformations are compatible with (or supported by) the one or more protection classes applied to the transformed data. Furthermore, a transformation-protection class compatibility matrix can specify protection classes and one or more compatible transformations. In this embodiment, compliance manager 136 consults the transformation-protection class compatibility matrix to determine whether the applied transformations are compatible with one or more protection policies applied to the transformed data.

If, in step 704, compliance manager 136 determines that the identified transformations applied to the transformed data comply with the retrieved data protection policies, then the operational steps of FIG. 7 end.

If, in step 704, compliance manager 136 determines that the identified transformations applied to the transformed data do not comply with the retrieved data protection policies, then, in step 706, compliance manager 136 proposes one or more equivalent transformations. As previously described, compliance manger 136 may use the transformation equivalence group specification to propose the equivalent transformation (e.g., lookup, mapping, sorting, encoding, etc.). Additionally, a transformation-protection class compatibility matrix may be used to ensure that the proposed transformation is compatible with the one or more protection classes applied to the transformed data.

In step 708, compliance manager 136 transmits the proposed transformations to intermediate computer system 130. In another embodiment, compliance manager 136 can perform operational steps described in FIG. 7 to provide alternative protection classes, and subsequently transmit the proposed operation to components of computing environment 100. Furthermore, intermediate computer system 130 can use the proposed transformations for current and/or future jobs, presenting the proposed transformations to an administrative user of computer system 130, etc.

FIG. 8 provides an example of source data from source application 112, in accordance with an embodiment of the present invention. The source data are medical records, and are to be transmitted to target application 122. In this embodiment, each column represents an attribute of the source data. Accordingly, values in the same column are a part of the same attribute. For example, values “Tom” and “Monica” are a part of the attribute, “NAME”.

FIG. 9 provides an example of metadata used by computing environment 100, in accordance with an embodiment of the present invention. For illustrative purposes, it should be understood that the information provided in FIG. 9 can be received at any time during the operation of computing environment 100. Additionally, the information provided in FIG. 9 may be stored or generated across multiple computer systems (i.e., source computer system 110, target computer system 120, intermediate computer system 130, etc.), and is not necessarily stored in one table as depicted in FIG. 9. In this embodiment, each attribute (i.e., “Column Name”) correlates to a technical type of data (i.e., “Character Encoding”), an attribute that is predefined by a glossary of data protection metadata repository 132 (i.e., “Glossary Defined Attribute”), a protection class, supported engine transformations, and a determination of whether the operations performed on each attribute are complaint with data protection policies for the attribute. For example, the attribute “SSN” in the source data can be correlated with the glossary defined attribute “Identification Number”. Furthermore, an attribute classification may provide additional information (e.g., SSN is an Identification number and must be protected). Additionally, source adapter 114 applies a “split” protection class to the attribute “SSN” such that the protected attribute classification “SSN” bypasses ETL engine 138 and is loaded into the respective “Identification Number” columns of tables in target application 122. Furthermore, source adapter 114 transcodes each “SSN” attribute such that the attributes are in the technical type (i.e., character encoding) indicated by information stored in metadata repository 134.

In this example, compliance manager 136 determines that transformations applied to the attribute “PATIENTCHARGE” are not compliant with data protection policies. In this embodiment, compliance manager 136 will provide a transformation to be reapplied to the attribute that is compliant with the data protection policies, as well as compatible (i.e., supported by), the “Encrypt-2” protection class. In another embodiment, compliance manger 136 may provide an alternative protection class (i.e., “Encrypt-1”), such that the transformation to be applied is supported by the newly provided protection class, and the transformation is compliant with the data protection policies.

Figure 10:
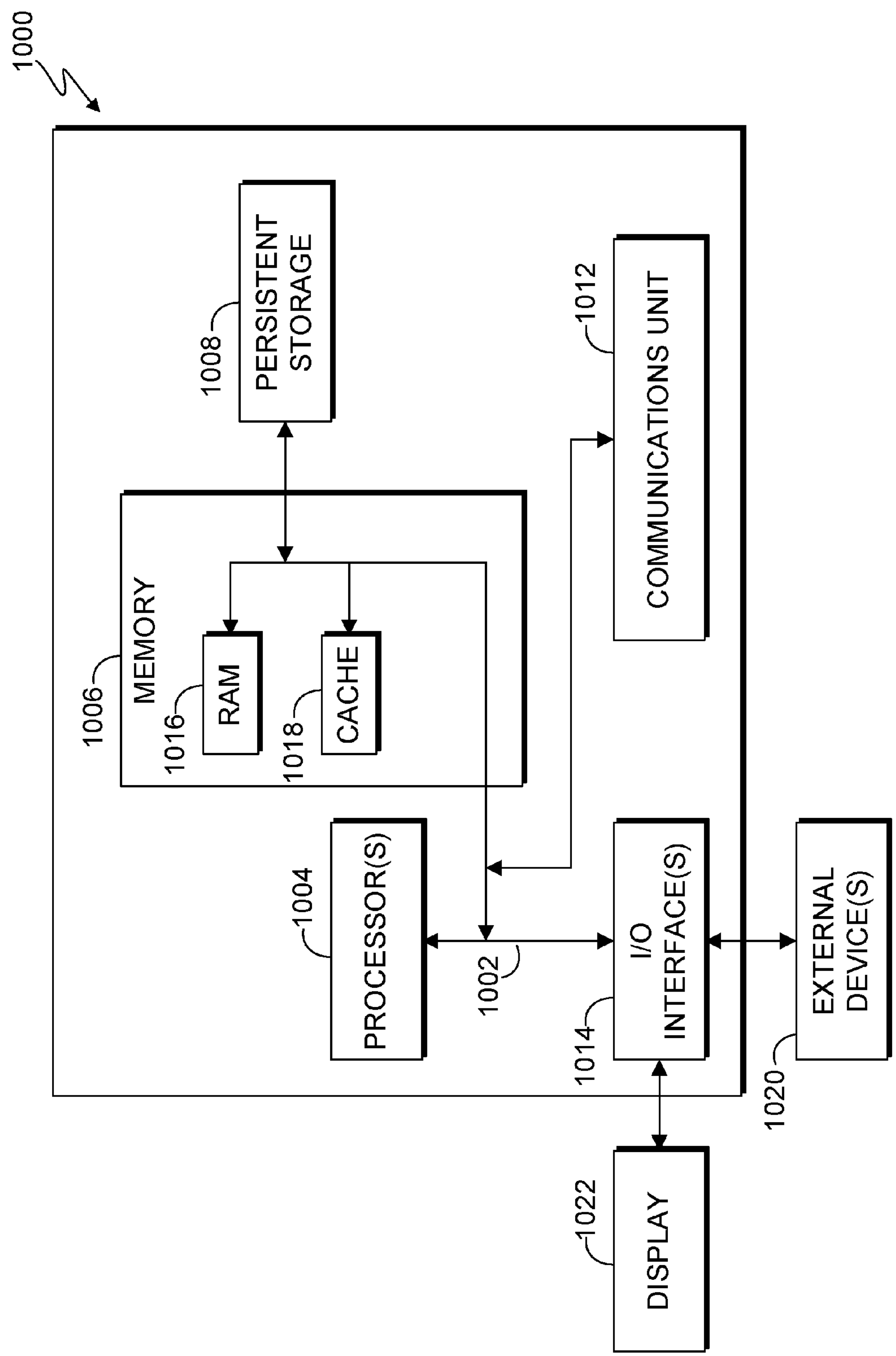
FIG. 10 is a block diagram of internal and external components of the computer systems of FIG. 1.

FIG. 10 is a block diagram of internal and external components of a computer system 1000, which is representative the computer systems of FIG. 1, in accordance with an embodiment of the present invention. It should be appreciated that FIG. 10 provides only an illustration of one implementation and does not imply any limitations with regard to the environments in which different embodiments may be implemented. In general, the components illustrated in FIG. 10 are representative of any electronic device capable of executing machine-readable program instructions. Examples of computer systems, environments, and/or configurations that may be represented by the components illustrated in FIG. 10 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 1000 includes communications fabric 1002, which provides for communications between one or more processors 1004, memory 1006, persistent storage 1008, communications unit 1012, and one or more input/output (I/O) interfaces 1014. Communications fabric 1002 can be implemented with any architecture designed for passing data and/or control information between processors (such as microprocessors, communications and network processors, etc.), system memory, peripheral devices, and any other hardware components within a system. For example, communications fabric 1002 can be implemented with one or more buses.

Memory 1006 and persistent storage 1008 are computer-readable storage media. In this embodiment, memory 1006 includes random access memory (RAM) 1016 and cache memory 1018. In general, memory 1006 can include any suitable volatile or non-volatile computer-readable storage media. Software is stored in persistent storage 1008 for execution and/or access by one or more of the respective processors 1004 via one or more memories of memory 1006.

Persistent storage 1008 may include, for example, a plurality of magnetic hard disk drives. Alternatively, or in addition to magnetic hard disk drives, persistent storage 1008 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 1008 can also be removable. For example, a removable hard drive can be used for persistent storage 1008. Other examples include optical and magnetic disks, thumb drives, and smart cards that are inserted into a drive for transfer onto another computer-readable storage medium that is also part of persistent storage 1008.

Communications unit 1012 provides for communications with other computer systems or devices via a network. In this exemplary embodiment, communications unit 1012 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded through communications unit 1012 (e.g., via the Internet, a local area network or other wide area network). From communications unit 1012, the software and data can be loaded onto persistent storage 1008.

One or more I/O interfaces 1014 allow for input and output of data with other devices that may be connected to computer system 1000. For example, I/O interface 1014 can provide a connection to one or more external devices 1020 such as a keyboard, computer mouse, touch screen, virtual keyboard, touch pad, pointing device, or other human interface devices. External devices 1020 can also include portable computer-readable storage media such as, for example, thumb drives, portable optical or magnetic disks, and memory cards. I/O interface 1014 also connects to display 1022.

Display 1022 provides a mechanism to display data to a user and can be, for example, a computer monitor. Display 1022 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for processing data in an extract, transform, and load system, the method comprising:

receiving, by a first computer system, data from a source application to be transformed by an intermediate computer system and transmitted to a target computer system, wherein the data includes values which are categorized into one or more attributes;

receiving, by the first computer, a plurality of user metadata from a registry, wherein the received plurality of user metadata includes a transformation specification;

correlating, by the first computer system, the one or more attributes to a predefined attribute, the protection class, and supported transformations, by referencing a glossary storing the predefined attributes and predefined data protection policies;

applying, by the first computer system, one or more data protection policies to the data to control user access to the data when stored on the intermediate computer system, wherein the one or more data protection policies include instructions to modify the values of the data using a protection class;

applying, by the first computer system, the one or more data protection policies to the received data to obscure content of the values of the data;

transmitting, by the first computer system, the data, which is protected and obscured, to the intermediate computer system; and transforming, by the intermediate computer system, the data into a format used by the target computer system based on the transformation specification.

2. The method of claim 1, wherein applying, by the first computer system, the one or more data protection policies to the received data to control user access to the data when stored on the intermediate computer system comprises:

accessing, by the first computer system, the intermediate computer system to obtain the one or more data protection policies; and applying to the received data, by the first computer system, one or more access rights specified by the obtained one or more data protection policies.

3. The method of claim 1, wherein applying, by the first computer system, the one or more data protection policies to the data to obscure content of the values of the data comprises:

accessing, by the first computer system, the intermediate computer system to obtain the one or more data protection policies; and applying to the data, by the first computer system, one or more protection classes specified by the obtained one or more data protection policies.

4. The method of claim 3, wherein applying to the data, by the first computer system, one or more protection classes specified by the obtained one or more data protection policies comprises:

performing, by the first computer system, one or more of an encryption, shuffle, hide, position, split, or pass operation.

5. The method of claim 1, further comprising:

receiving, by the intermediate computer system, a request to modify the data;

determining, by the intermediate computer system, whether a user associated with the received request is authorized to modify the data;

responsive to determining that the user associated with the received request is authorized to modify the data, reverting, by the intermediate computer system, one or more protection classes applied to the data;

applying, by the intermediate computer system, one or more user changes to the data; and reapplying, by the intermediate computer system, the one or more protection classes to the data.

6. The method of claim 5, further comprising:

responsive to determining that the user associated with the received request is not authorized to modify the data, preventing the user from reverting the one or more protection classes applied to the data.

7. The method of claim 1, wherein transforming, by the intermediate computer system, the data into a format used by the target computer system comprises:

performing, by the intermediate computer system, on the data, one or more of a lookup, a map, or a sort operation.

8. The method of claim 1, further comprising:

determining whether a first transformation made to the data is compatible with one or more protection classes applied to the data; and responsive to determining that the first transformation made to the data is not compatible with the one or more protection classes applied to the data, recommending, by the intermediate computer system, one or more alternative transformations that are compatible with the one or more protection classes applied to the data.

9. The method of claim 8, wherein the one or more alternative transformations are determined to be equivalent to the first transformation made to the data.

10. A computer program product for processing data in an extract, transform, and load system, comprising:

one or more computer readable storage media and program instructions stored on the one or more computer readable storage media, the program instructions comprising:

program instructions to receive data from a source application to be transformed by an intermediate computer system and transmitted to a target computer system, wherein the data includes values which are categorized into one or more attributes;

program instructions to receive a plurality of user metadata from a registry, wherein the received plurality of user metadata includes a transformation specification;

program instructions to correlate the one or more attributes to a predefined attribute, the protection class, and supported transformations, by referencing a glossary storing the predefined attributes and predefined data protection policies;

program instructions to apply one or more data protection policies to the data to control user access to the data when stored on the intermediate computer system, wherein the one or more data protection policies include instructions to modify the values of the data using a protection class;

program instructions to apply the one or more data protection policies to the data to obscure the values of the data;

program instructions to transmit the data, which is protected and obscured, to the intermediate computer system; and program instructions to transform the data into a format used by the target computer system based on the transformation specification.

11. The computer program product of claim 10, wherein program instructions to apply the one or more data protection policies to the data to control user access to the data when stored on the intermediate computer system, comprise:

program instructions to access the intermediate computer system to obtain the one or more data protection policies;

program instructions to apply one or more access rights specified by the obtained one or more data protection policies; and program instructions to apply one or more protection classes specified by the obtained one or more data protection policies.

12. The computer program product of claim 11, wherein program instructions to apply one or more protection classes specified by the obtained one or more data protection policies, comprise:

program instructions to perform one or more of an encryption, shuffle, hide, position, split, or pass operation.

13. The computer program product of claim 10, wherein program instructions stored on the one or more computer readable storage media further comprise:

program instructions to receive a request to modify the data;

program instructions to determine whether a user associated with the received request is authorized to modify data;

program instructions to, responsive to determining that the user associated with the received request is authorized to modify the data, revert the one or more protection classes applied to the data;

program instructions to apply one or more user changes to the data; and program instructions to reapply the one or more protection classes to the data.

14. The computer program product of claim 13, wherein program instructions stored on the one or more computer readable storage media further comprise:

program instructions to, responsive to determining that the user associated with the received request is not authorized to modify the data, prevent the user from reverting the one or more protection classes applied to the data.

15. The computer program product of claim 10, wherein program instructions stored on the one or more computer readable storage media further comprise:

program instructions to determine whether a transformation made to the data is compatible with the one or more protection classes applied to the data; and program instructions to, responsive to determining that the transformation made to the data is not compatible with the one or more protection classes applied to the data, recommend one or more alternative transformations that are compatible with the one or more protection classes applied to the data.

16. A computer system for processing data from a first computer system, comprising:

one or more computer processors;

one or more computer readable storage media;

program instructions stored on the one or more computer readable storage media for execution by at least one of the one or more processors, the program instructions comprising:

program instructions to receive data from a source application to be transformed by an intermediate computer system and transmitted to a target computer system, wherein the data includes values which are categorized into one or more attributes;

program instructions to receive a plurality of user metadata from a registry, wherein the received plurality of user metadata includes a transformation specification;

program instructions to correlate the one or more attributes to a predefined attribute, the protection class, and supported transformations, by referencing a glossary storing the predefined attributes and predefined data protection policies;

program instructions to apply one or more data protection policies to the data to control user access to the data when stored on the intermediate computer system, wherein the one or more data protection policies include instructions to modify the values of the data using a protection class;

program instructions to apply the one or more data protection policies to the data to obscure the values of the data;

program instructions to transmit the data, which is protected and obscured, to the intermediate computer system; and program instructions to transform the data into a format used by the target computer system based on the transformation specification.

17. The computer system of claim 16, wherein program instructions to apply the one or more data protection policies to the data to control user access to the data when stored on the intermediate computer system, comprise:

program instructions to access the intermediate computer system to obtain the one or more data protection policies;

program instructions to apply one or more access rights specified by the obtained one or more data protection policies; and program instructions to apply one or more protection classes specified by the obtained one or more data protection policies.

18. The computer system of claim 17, wherein program instructions to apply one or more protection classes specified by the obtained one or more data protection policies, comprise:

program instructions to perform one or more of an encryption, shuffle, hide, position, split, or pass operation.

19. The computer system of claim 16, wherein program instructions stored on the one or more computer readable storage media further comprise:

program instructions to receive a request to modify the data;

program instructions to determine whether a user associated with the received request is authorized to modify the data;

program instructions to, responsive to determining that the user associated with the received request is authorized to modify the data, revert the one or more protection classes applied to the data;

program instructions to apply one or more user changes to the data; and program instructions to reapply the one or more protection classes to the data.

20. The computer system of claim 16, wherein program instructions stored on the one or more computer readable storage media further comprise:

program instructions to determine whether a transformation made to the data is compatible with the one or more protection classes applied to the data; and program instructions to, responsive to determining that the transformation made to the data is not compatible with the one or more protection classes applied to the data, recommend one or more alternative transformations that are compatible with the one or more protection classes applied to the data.

* * * * *